June 11, 1940.  C. D. JOHNSTON  2,204,415
SHOCK ABSORBER
Filed Aug. 1, 1938

Inventor
C. D. Johnston

Patented June 11, 1940

2,204,415

UNITED STATES PATENT OFFICE 2,204,415

SHOCK ABSORBER

Curtis Daniel Johnston, Black River, Jamaica

Application August 1, 1938, Serial No. 222,401

4 Claims. (Cl. 267—31)

This invention relates to cushioning devices for automobiles, trucks, trailers and other vehicles for relieving the objectionable road shocks which usually occur while travelling over rough or uneven surfaces, and the object of my invention is to devise a construction employing an air cushion to take the major part of the shock.

Figure 1:
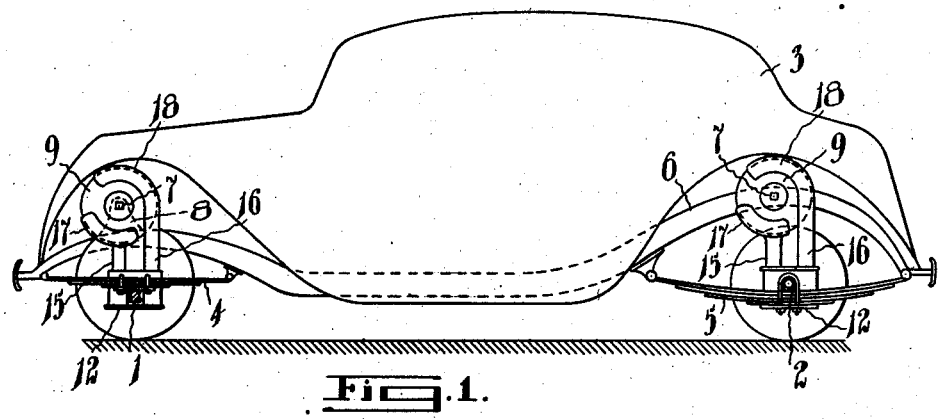
Figure 2:
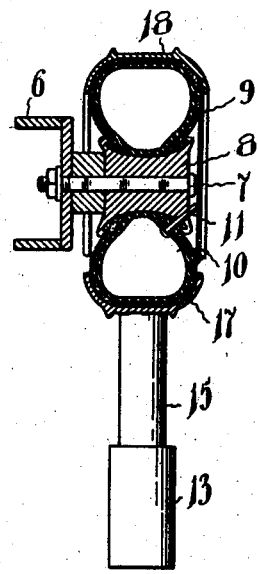

I attain my object by means of the constructions hereinafter described and illustrated in the accompanying drawing in which Fig. 1 is a side elevation of a motor car showing the improved shock absorbers applied thereto;

Fig. 2 is a vertical section of the absorber; and

Figure 3:
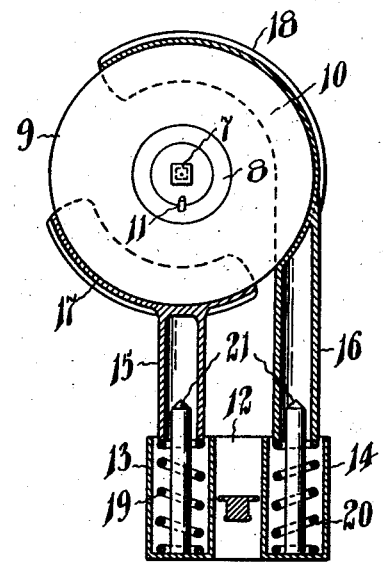

Fig. 3 a section on the line 3—3 in Fig. 3.

In the drawing like numerals of reference indicate corresponding parts in the different figures.

Referring to Fig. 1, 1 indicates a front axle and 2 the rear axle on which the motor car body 3 is supported by springs 4 and 5 in the ordinary manner. Four shock absorbers will preferably be employed, two for the front axle, one of which will be positioned at each side of the body, and two for the rear axle, one of which will also be positioned at each side of the body.

The invention, however, is concerned with the particular construction of the shock absorbers, which will now be described.

On the chassis 6 of the vehicle is mounted a laterally directed pin 7 which pin may be secured directly to the chassis as indicated at the rear of the motor car in Figure 1, or to a special bracket 8 as indicated at the front of the vehicle in Fig. 1, to provide sufficient room for the installation and operation of the shock absorber. On this pin 7 is mounted a rim 8 adapted to receive an annular pneumatic cushioning member, the latter being preferably provided with an outer casing 9 demountably supported on the rim and an inner inflatable tube 10, the arrangement being very similar to that of a pneumatic tire as used on the ground wheels of an automobile. The inner tube is provided with a valve 11 by means of which it may be inflated or deflated as desired.

On the axle is mounted a member 12, on which is formed a pair of guide sleeves 13 and 14 into which project tubular rods 15 and 16. The rod 15 is provided with an arc-shaped head 17 in which the under side of the cushioning member is seated, while the rod 16 is provided with an arc-shaped head 18 which is adapted to hook over the upper side of the cushioning member. Both heads 17 and 18 are concaved in cross section to receive the cushioning member, and are also preferably provided with ribs for stiffening purposes.

Attached to and forming a continuation of the lower end of the rod 15 is a spring 19, the other end of which spring is secured to or bears against the bottom of the sleeve 13. This spring is normally in a state of partial compression. Similarly a spring 20 has one end secured to and forms a continuation of the rod 16, the other end of this spring being secured or anchored to the bottom of the sleeve 14. This spring 20 is normally in a state of partial tension.

A guide pin 21 is provided for each of the springs 19 and 20 to hold the same in place, which pins are of a length to extend partly into the tubular rods 15 and 16.

The operation of the shock absorber is as follows. In going over a bump, the tendency is for the axle and chassis frame to move closer together. This causes a further compression of the spring 19, while the tension on the spring 20 is reduced. At the same time pressure is exerted against the stationary pneumatic cushioning member by the head 17, the pressure being relieved on the opposite side by the reduction of the tension on the spring 20. Upon the rebound or separating movement of the axle and chassis, the tensioning on the spring 20 is increased while the compression of the spring 19 is decreased, and similarly while the pressure of the head 18 on the pneumatic member increases, the pressure from the head 17 decreases.

It will be seen that the springs 19 and 20 tend to keep the axle and chassis spaced an intermediate distance due to the fact that any strain on the one is counteracted by a corresponding strain on the other, and similarly any pressure on either the lower or upper side of the pneumatic cushioning member will be relieved at the opposite side. In the event that the shock is of such a nature as to compress the springs to their limit, any additional movement will be applied against the pneumatic cushioning member.

It will be apparent, of course, that the resiliency of the pneumatic cushioning member may be readily controlled by the air pressure within it. It will also be seen that the shock absorber comprises few moving parts and there is little danger of it getting out of order. It is also comparatively easy to install.

What I claim as my invention is:

1. For use with a vehicle having an axle and a body resiliently mounted on the axle, a shock absorber comprising a support adapted to be mounted on to the body; a support adapted to be mounted on the axle, one of said supports having pneumatic cushioning means mounted thereon; a pair of compressor members, a spring connecting each of said compressor members to said support, one of said springs being under tension and the other under compression, the compressor members to which the compression spring is connected engaging the adjacent side of the cushioning means to resist movement of the supports towards one another, and the compressor member to which the tension spring is connected engaging the remote side of the cushioning means to resist movement of said supports away from one another.

2. For use with a vehicle, having an axle and a body resiliently mounted on the axle, a shock absorber comprising a support adapted to be mounted on to the body; a support adapted to be mounted on the axle, one of said supports having pneumatic cushioning means mounted thereon; a pair of compressor members; a spring connecting each of said compressor members to said support, one of said springs being under tension and the other under compression, the compressor members to which the compression spring is connected engaging the adjacent side of the cushioning means to resist movement of the supports towards one another, and the compressor member to which the tension spring is connected engaging the remote side of the cushioning means to resist movement of said supports away from one another, said other support having guide sleeves thereon to receive the springs and adjacent ends of the compressor members.

3. For use with a vehicle having an axle and a body resiliently mounted on the axle, a shock absorber comprising a support adapted to be mounted on to the body; a support adapted to be mounted on the axle, one of said supports having pneumatic cushioning means mounted thereon; a pair of compressor members, each having a tubular stem; a spring connecting the tubular stems of each compressor member to said support, one of said springs being under tension and the other under compression, the compressor members to which the compression spring is connected engaging the adjacent side of the cushioning means to resist movement of the supports towards one another, and the compressor member to which the tension spring is connected engaging the remote side of the cushioning means to resist movement of said supports away from one another, said other support having guide pins thereon projecting into the tubular stems.

4. For use with a vehicle having an axle and a body resiliently mounted on the axle, a shock absorber comprising a support adapted to be mounted on to the body; a support adapted to be mounted on the axle, one of said supports having pneumatic cushioning means mounted thereon; a pair of compressor members, each having a tubular stem; a spring connecting the tubular stems of each compressor member to said support, one of said springs being under tension and the other under compression, the compressor members to which the compression spring is connected engaging the adjacent side of the cushioning means to resist movement of the supports towards one another, and the compressor member to which the tension spring is connected engaging the remote side of the cushioning means to resist movement of said supports away from one another, said other support having guide pins thereon projecting into the tubular stems, said other support also having guide sleeves thereon to receive the springs and adjacent ends of the tubular stems.

CURTIS DANIEL JOHNSTON.